United States Patent [19]
Sirbu et al.

[11] Patent Number: 5,809,144
[45] Date of Patent: Sep. 15, 1998

[54] METHOD AND APPARATUS FOR PURCHASING AND DELIVERING DIGITAL GOODS OVER A NETWORK

[75] Inventors: Marvin A. Sirbu; J. D. Tygar; Benjamin T. H. Cox; Thomas Wagner, all of Pittsburgh, Pa.

[73] Assignee: Carnegie Mellon University, Pittsburgh, Pa.

[21] Appl. No.: 519,074

[22] Filed: Aug. 24, 1995

[51] Int. Cl.[6] .................................................. H04L 9/00
[52] U.S. Cl. ................... 380/25; 380/9; 380/21; 380/23; 380/24; 380/29; 380/30; 380/49; 380/59; 705/26; 705/27
[58] Field of Search ............................... 380/4, 9, 23, 24, 380/25, 21, 29, 30, 44, 46, 49, 50, 59; 395/226, 227, 230, 235, 239, 240, 242, 244; 705/26, 27, 39, 40, 41, 42, 43, 44, 45

[56] References Cited

U.S. PATENT DOCUMENTS 5,191,573 3/1993 Hair.
5,383,113 1/1995 Kight et al..

OTHER PUBLICATIONS

B. Clifford Neuman, Proxy–Based Authorization and Accounting for Distributed Systems, Proceedings of the 13th International Conference on Distributed Computing Systems, Pittsburgh, May 1993.
Internet Billing Service Design and Prototype Implementation INI Technical Report TR 1992–2, Richard Batelaan, Mar. 30, 1993.
The Internet Billing Server Transaction Protocol Alternatives INI TR 1994–1, Kevin O'Toole, Apr. 26, 1994.
Network Based Billing Server TR 1991–7, Stephen Mak.
Alireza Bahreman, Certified Electronic Mail, Feb., 1994.
"How NetBill works"; no author listed; earliest copyright date is 1995; Carnegie Mellon University; posted on the Internet at http://www.netbill.com./netbillworks.html.

iKP—A Family of Secure Electronic Payment Protocols, Mihir Bellare, Juan A. Garay, Ralf Hauser, Amir Herzberg, Hugo Krawczyk, Michael Steiner, Gene Tsudik and Michael Waidner, believed to be published on May 8, 1995.

Carnegie Mellon University Information Networking Institute, Maintaining Privacy In Electronic Transactions, Benjamin T.H. Cox, belived to be published before Aug. 24, 1995.

(List continued on next page.)

*Primary Examiner*—Bernarr E. Gregory
*Attorney, Agent, or Firm*—Kirkpatrick & Lockhart LLP

[57] ABSTRACT

A method for purchasing and delivering goods over a network is comprised of the steps of identifying a digital good to be purchased. A purchase price for the digital good is negotiated. After the negotiation step, an authenticated purchase request is sent to the merchant. The merchant encrypts the desired digital good and calculates a first cryptographic checksum for the encrypted good. The encrypted digital good and the first cryptographic checksum together with a timestamp are then transmitted to the customer. The customer calculates a second cryptographic checksum for the received encrypted digital good. The customer creates an electronic payment order containing information identifying the transaction, the second cryptographic checksum, credentials, and the timestamp. The electronic payment order is transmitted to the merchant. The merchant compares the first and second cryptographic checksums to ensure that they match, and if so, the merchant adds an electronic signature and a decryption key to the electronic payment order. The merchant submits the merchant signed electronic payment order and the key to an account server for review. The account server reviews the information in the electronic payment order and sends a message, including the key if the review is positive, to the merchant. The merchant forwards the message to the customer. If the message contained the key, the customer uses the key to decrypt the goods.

128 Claims, 6 Drawing Sheets

OTHER PUBLICATIONS

A Secure, Cheap, Scalable and Exportable/Importable Method for Internet Electronic Payments, Wenbo Mao, believed to be published on May 4, 1995.

Richard Batelaan et al., An Internet Billing Server: System Requirements, Carnegie Mellon University, Jul., 1992 TR 1992–1.

Eric Bodner et al., An Internet Billing Server: MS4 Billing Server Prototype Scope Document, Carnegie Mellon University, 1993 TR 1993–1.

Eric Bodner et al., An Internet Billing Server: Prototype Requirements, Carnegie Mellon University, 1993 TR 1993–2.

Eric Bodner et al., The Internet Billing Server: Design Document, Carnegie Mellon University, 1993, TR 1993–3.

Eric Bodner et al., An Internet Billing Server: Analysis of Distributed Computing and Cross Platform Issues, Carnegie Mellon University, 1993 TR 1993–4.

Eric Bodner et al., An Internet Billing Server: Availability, Reliability & Scalability Issues in the MS4 Billing Server Design & Prototype, Carnegie Mellon University, 1993 TR 1993–5.

FIG. 9

Fields (left to right): Customer's Identity | Product Identifier | Negotiated Price | Merchant Identifier | Second Check Sum | EPOID | Customer Digital Signature | ........ | Merchant's Account No. | Merchant's Memo Field | Decryption Key | Merchant's Digital Signature (42)

FIG. 8

Fields (left to right): Customer's Identity | Product Identifier | Negotiated Price | Merchant Identifier | Second Check Sum | ........ | EPOID | Customer Digital Signiture (40)

METHOD AND APPARATUS FOR PURCHASING AND DELIVERING DIGITAL GOODS OVER A NETWORK

BACKGROUND OF THE INVENTION

1. Field of the Invention

The present invention is directed generally to communications protocols, and more particularly to methods of carrying out commercial transactions over a computer network.

2. Description of the Background

Buyers and sellers increasingly want to use the Internet to conduct their business electronically. As a base for commerce, the Internet poses special challenges due to its lack of standard security mechanisms. At the same time, the ease with which buyers can peruse catalogs published via the World Wide Web makes the Internet attractive for commerce. Consumers would like to use the Internet as a means for multiple phases of the purchase process: searching for suppliers, price negotiation, ordering, and payment for goods. In the case of information items, such as software or journal pages, videos, music, or any item that can be digitized and stored, such goods can be delivered over the Internet as digital information.

Using the Internet for commerce poses new variations on traditional issues. Transactions occur in cyberspace with no easily identifiable place of business for the merchant or physical delivery site for the customer. The possibilities for fraud both from the buyer and seller's point of view raise special issues in such an environment. Transactions are subject to observation by third parties sharing the network. Although the use of computers to support transactions makes record keeping easier, it exacerbates privacy problems arising from transaction data collection by merchants or third parties.

Supporting transactions in cyberspace requires electronic analogs for many familiar procedures from face-to-face transactions. Parties need to know with whom they are dealing, Supporting transactions in cyberspace requires electronic analogs for many familiar procedures from face-to-face transactions. Parties need to know with whom they are dealing, or at least verify their creditworthiness. They need to be able to negotiate prices, perhaps providing credentials entitling them to special discounts, such as a student ID. Parents need methods to control where their children shop in cyberspace. In the case of information goods, the value of an item may be as low as a few cents, requiring transaction mechanisms which impose per-transaction overheads much smaller than those for typical check and credit card purchases. To restrict distribution of sensitive materials, merchants need to restrict the class of customers they support. That may be accomplished through the used of some type of credential. Although there is no shortage of companies wishing to conduct business over the Internet, no mechanism has come forward which satisfies the aforementioned needs.

SUMMARY OF THE INVENTION

The present invention is directed to a method and apparatus for purchasing and delivering goods over a network. The method is comprised of the steps of identifying a digital good to be purchased. A purchase price for the digital good is negotiated. A request for quotation or a bid sent to the merchant may include credentials identifying the customer for purposes of, for example, providing a discount. After the negotiating phase, the customer requests delivery of the goods.

The merchant encrypts the digital good which the customer wishes to purchase. A first cryptographic checksum is calculated by the merchant for the encrypted good. The encrypted digital good and the first cryptographic checksum are then transmitted to the customer. A timestamp is generated by the merchant at the end of goods transmission and sent to the customer.

The customer receives the encrypted digital good and the first cryptographic checksum. The customer calculates a second cryptographic checksum for the received encrypted digital good. The customer creates an electronic payment order containing information identifying the transaction, the second cryptographic checksum, credentials, for example, authorizing the customer to purchase the goods, and a timestamp. The electronic payment order is transmitted to the merchant.

The merchant compares the first and second cryptographic checksums to ensure that they match. A match indicates that the digital good has been correctly received. The merchant adds an electronic signature and a decryption key to the electronic payment order. The merchant submits the merchant signed electronic payment order and the key to an account server for review.

The account server reviews the information in the electronic payment order and sends a message to the merchant in response to the review. The review may include verifying that the customer is authorized to make the requested purchase, verifying that the customer has the necessary funds, and ensuring that the timestamp is valid. As a result of the review, a message is sent to the merchant. In the event the review the not positive, an error code is contained within the message which explains why the electronic payment order has not been approved. If the report is positive, the message so indicates and the message contains the key.

The merchant forwards the message to the customer. If the message contained the key, the customer uses the key to decrypt the goods. If, for some reason, the customer does not obtain the key from the merchant, the customer may contact the account server and obtain a copy of the key from the server.

Objectives of the present invention include:

The customer and merchant must agree on the item to be purchased and the price to be charged. That contemplates an offer and acceptance negotiation phase between customer and merchant.

A customer may present credentials proving membership in groups to qualify for discounts or other purposes. That supports access control, which may be outsourced so that different users may use different access control servers.

The use of timestamps at the end of transmission of the digital good ensures that electronic payment orders contain a fresh timestamp.

To achieve those objectives, the method and apparatus of the present invention provide for strong authentication and privacy and a flexible access control system. Those and other advantages and benefits of the present invention will become apparent from the Description Of The Preferred Embodiments hereinbelow.

BRIEF DESCRIPTION OF THE DRAWINGS

For the present invention to be clearly understood and readily practiced, the present invention will be described in conjunction with the following figures wherein:

FIG. 8 illustrates certain of the information contained in a digital message referred to as the electronic purchase order (EPO);

FIG. 9 illustrates certain of the information contained in a digital message referred to as the countersigned EPO.

DESCRIPTION OF THE PREFERRED EMBODIMENTS

The method and apparatus of the present invention are optimized for the sale and delivery of low-priced digitized goods available on a network although it is equally well suited for the sale and delivery of high priced digital goods. In its generalized form, the invention could also be used for non-digitized goods. We focus in this discussion on the sale and delivery of low priced digitized goods because they present unique problems not found in the sale of high priced goods, i.e., how do you justify the sale of goods costing five cents when the typical overhead is fifty cents.

Figure 1:
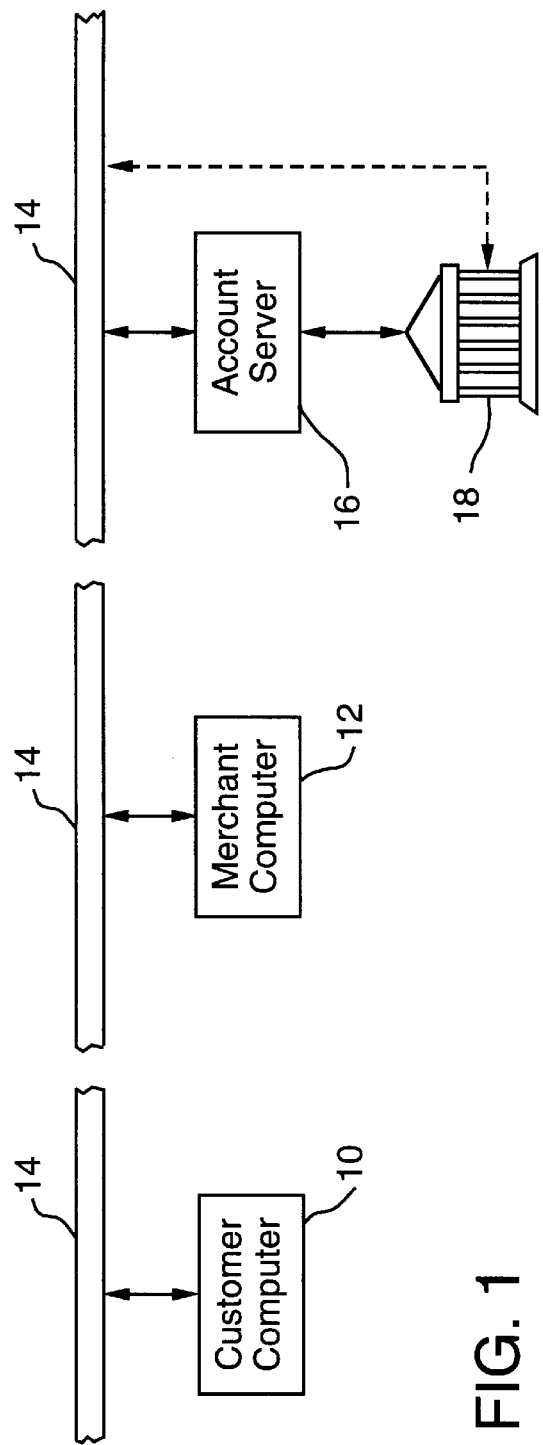
FIG. 1 illustrates a customer, a merchant, an account server, and a financial institution interconnected by a network.

In FIG. 1, a customer computer 10 is connected to a merchant server 12 through a network 14 which may be, for example, the Internet. Digital goods, i.e. articles, photographs, music, videos, software, etc. have been digitized and stored on the merchant server 12 which is a computer connected to the network 14. An account server 16 maintains accounts for both customers and merchants. The account server 16 is either directly linked to a conventional financial institution 18 or is linked to the financial institution through the network 14. The reader should understand that although only one customer computer 10 and one merchant server 12 are illustrated in FIG. 1, it is anticipated that by using the Internet as the network 14, there could be millions of customers and merchants connected to the network 14 at any given time.

As will be described in detail hereinafter, a transaction typically consists of transferring a digital good from the merchant to the customer. The transfer of a digital good consists of delivering bits from the merchant server 12 to the customer computer 10. Customers may be charged on a per item basis, by a subscription allowing unlimited access, or by any number of other pricing models. The transaction also consists of debiting the customer's account and crediting the merchant's account for the value of the goods. When necessary, funds in a customer's account can be replenished from a bank or credit card; similarly, funds in a merchant's account are made available by depositing them in the merchant's bank account in financial institution 18. The account server 16 also acts as an aggregator to combine many small transactions into larger conventional transactions thereby amortizing conventional overhead fees.

A transaction typically involves three parties: the customer, the merchant, and the account server 16. A transaction may also be viewed as involving three phases: price negotiation, goods delivery, and payment. For digital goods which can be delivered over the network 14, goods delivery and payment are linked into a single atomic transaction. In a transaction, the customer and merchant interact with each other in the first two phases. The account server 16 is not involved until the payment phase, when the merchant submits a request for payment. The customer directly contacts the server 16 only in the case of communications failure or when requesting administrative functions.

Figure 2:
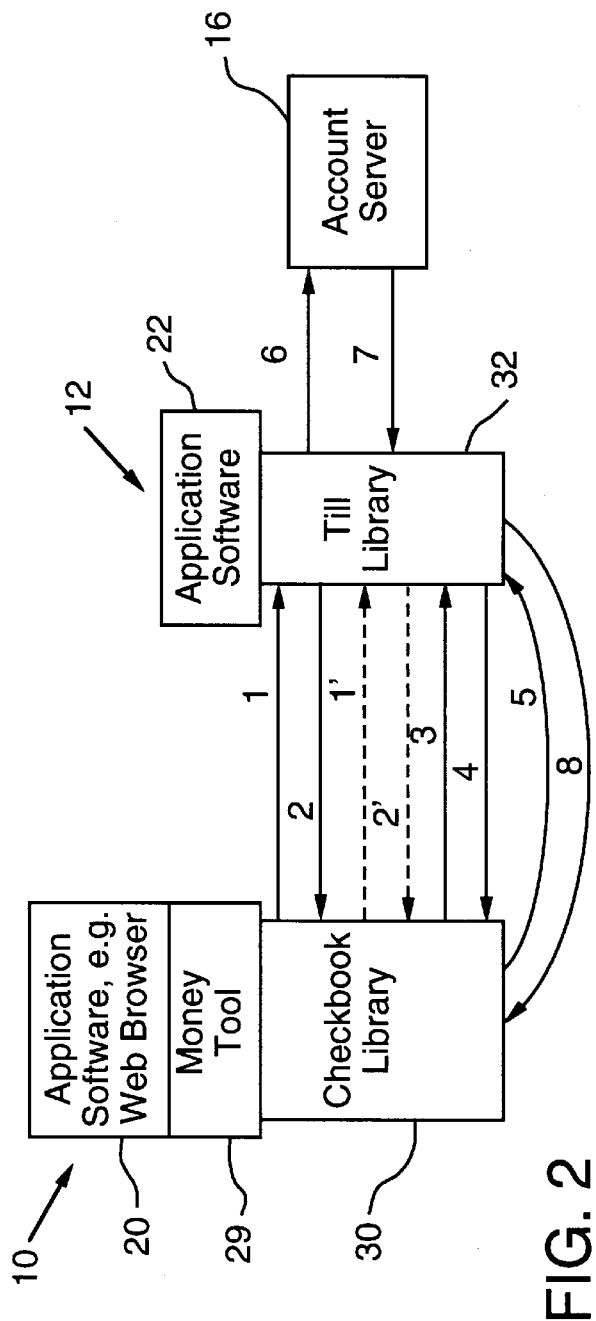
FIG. 2 illustrates the steps in a transaction carried out between the customer, the merchant, and the account server shown in FIG. 1.

FIG. 2 illustrates the relationships among parties in a typical transaction involving digital goods contemplated by the present invention. The reader should understand that the transaction requires application software 20 residing on the customer computer 10 and application software 22 residing on the merchant computer 12. Software on the customer's computer which implements the functionality needed by the present invention is embodied in the component labeled checkbook library 30. The checkbook library 30 can be called by any of a wide range of customer application software 20 such as a web browser, a video display program, or other application. The embodiment for use with a web browser supposes a software component labeled money tool 29 which knits together the checkbook library 30 and the application software 20, all residing on the customer's computer 10. The merchant application software 22 interacts with till library software 32, both residing on the merchant computer 12.

OVERVIEW OF A TRANSACTION

Before a customer begins a typical transaction, the customer will usually contact merchant server 12 to locate information or a service of interest. For example, the customer may request a table of contents of a journal showing available articles, and a list price associated with each article. The transaction begins at a step 1 when the customer requests a formal price quote for a product. That price may be different than the standard list price because, for example, the customer may be part of a site license group, and thus be entitled to a marginal price of zero. Alternatively, by presenting a credential (discussed hereinbelow) the customer may be entitled to some form of discount, or perhaps there is a surcharge during hours of peak usage.

Figure 5:
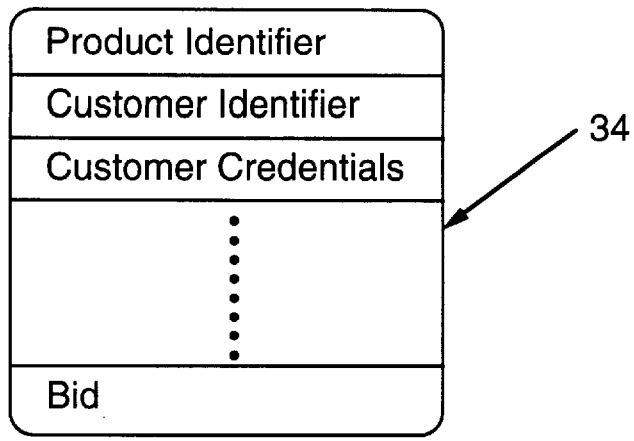
FIG. 5 illustrates certain of the information contained in a digital message referred to as an authenticated request.
Figure 6:
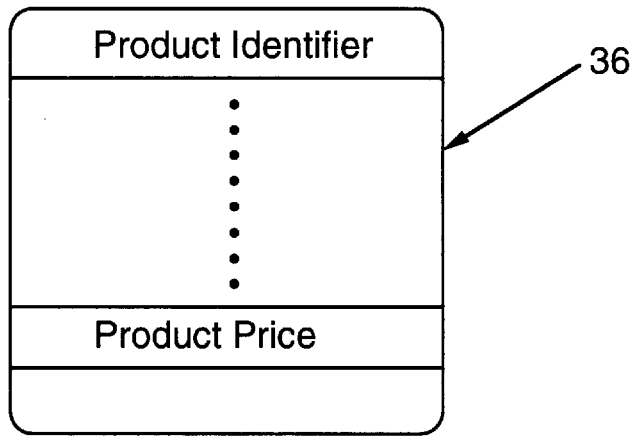
FIG. 6 illustrates certain of the information contained in a digital message referred to as a digitally signed price quotation.
Figure 7:
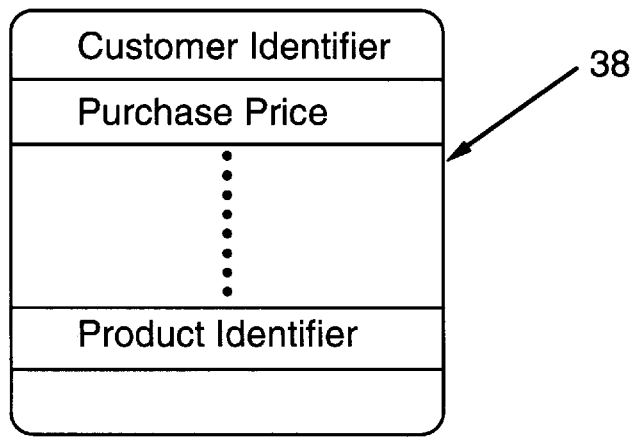
FIG. 7 illustrates certain of the information contained in a digital message referred to as the digitally signed purchase request.
Figure 10:
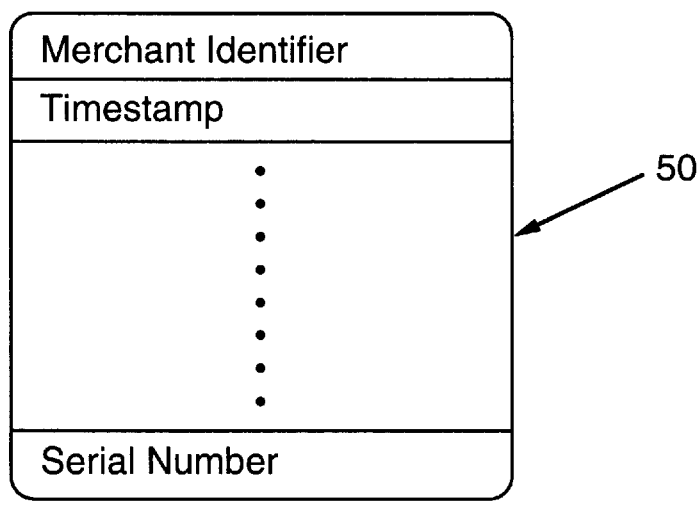
FIG. 10 illustrates certain of the information contained in the fields referred to in the above figures as the electronic payment order ID (EPOID).

Requesting the price quotation is discussed in an article by two of the inventors of the present invention in Sirbu and Tygar, "NetBill: An Internet Commerce System Optimized for Network Delivered Services" published in Technologies for the Information Superhighway, COMPCON 1995, March 5–9, 1995 San Francisco, Calif., IEEE Computer Society Press, which is hereby incorporated by reference. The customer application software 20 indicates to the checkbook library 30 that the customer would like a price quote from a particular merchant for a specified product. The checkbook library 30 creates an authenticated request 34 (See FIG. 5) which includes, for example, the following information: product identifier, customer identifier, customer credentials, and a bid (if applicable). The reader will understand that the authenticated request is a digital message comprised of ones and zeros. The representation of the authenticated request 34 in FIG. 5, as well as the representations in FIGS. 6–10, are presented for purposes of explanation. The authenticated request 34 additionally contains other information needed for such a digital message to be transferred from the customer computer 10 over the network 14 to the merchant computer 12.

The checkbook library 30 sends at step 1 in FIG. 2 the authenticated request to the merchant till library 32 which forwards the request 34 to the merchant application software 22. As discussed in the aforementioned article, the customer application software 20 may be constructed such that the request for a price quotation may be initiated by simply clicking on a displayed article reference.

The merchant application software 22 invokes an algorithm to review the authenticated request 34. Based on the information in the authenticated request 34, the merchant application software creates an authenticated price quotation 36 (See FIG. 6) which includes, for example, the following information: product identifier and product price. The merchant: application software 22 sends at step 2 the authenticated price quotation 36 through the till library 32 to the customer checkbook library 30, and on to the customer application software 20. The customer application software 20 then must make a purchase decision. The application software 20 can present the price quote to the customer or it can approve the purchase without prompting the customer. For example, the customer may specify that the application software 20 accept any price quote below some threshold amount. That relieves the customer of the burden of assenting to every low-value price quotation via a dialogue box.

If the price quotation is not acceptable, the process may proceed as shown by step 1' in which the customer makes a counter-offer by sending authenticated request 34 with different bid information and step 2' in which the merchant either accepts the counter-offer by sending a price quotation 36 wherein the product price is the same as the bid in the authenticated request 34 or submits a new price quotation 36 having yet another product price. Steps 1' and 2' may be carried out a number of times until a price is agreed upon. It is anticipated that steps 1' and 2' would be used primarily for transactions involving unique goods. For goods that are mass retailed, i.e. movies, low cost copies of articles, etc., steps 1' and 2' would likely not be used as the cost of mass retailed goods is typically not negotiated.

Assume the customer's application software 20 accepts the price quote. The checkbook library 30 then sends at step 3 a purchase request 38 (See FIG. 7) to the merchant till library 32. The purchase request 38 may include, for example, a customer identifier, product identifier, and purchase price. The merchant till library 32 passes the purchase request to the merchant application software 22 which requests the digital good from the merchant server 12. The merchant application software 22 encrypts the digital good and computes a first cryptographic checksum, such as MD5, on the encrypted digital good. The encrypted goods and first checksum are sent to the till library 32 which sends them in step 4 to the customer checkbook library 30. As the checkbook library 30 receives the bits, it writes them to memory or storage within computer 10. The last item sent is an EPOID (See FIG. 10) which includes a timestamp as of the end of transmission of the goods. When the transfer is complete, the checkbook library 30 computes a second cryptographic checksum on the received encrypted goods. The checkbook library 30 sends to the merchant till library 32 at step 5 a digitally signed electronic payment order 40 (EPO) (See FIG. 8) which may include, for example, the following information: customer identity (or pseudonym), product identifier, negotiated price, merchant identifier, the second cryptographic checksum, the EPOID containing the timestamp, and a digital signature. At that point, although the customer has the digital good, the customer cannot decrypt the good and the customer has not yet been charged.

Upon receipt of the EPO 40, the till library 32 checks the first checksum against the second checksum computed by the customer's checkbook library 30. If the checksums do not match, then either the digital good can be retransmitted or the transaction can be aborted. The step of comparing the first and second checksums provides very high assurance that the encrypted good was received without error.

If the first and second checksums match, the merchant application software adds to the EPO the merchant's account number, a merchant memo field, an electronic signature, and the key needed to decrypt the good to create a countersigned EPO 42. (See FIG. 9). The merchant application software sends the countersigned EPO 42 to the account server 16 at step 6 for review.

The account server 16 verifies that the customer and merchant signatures are valid, verifies that the customer has the funds needed for the transaction as well as checking the validity of any credentials. The EPOID is reviewed to make sure this is not a replay of a previous transaction, and the timestamp is reviewed to insure that the transaction is not stale. If the review is positive, meaning that all the information is valid, the customer has the necessary funds or credit in the customer's account, and the timestamp is valid, the account server 16 debits the customer's account and credits the merchant's account, logs the transaction, and saves a copy of the decryption key. The account server 16 returns to the merchant at step 7 a digitally signed message containing an approval, or an error code indicating why the transaction failed, and the key. The merchant application software forwards the account server message and (if appropriate) the decryption key to the customer's checkbook library 30 at step 8.

MERCHANT PAYMENT

Figure 3:
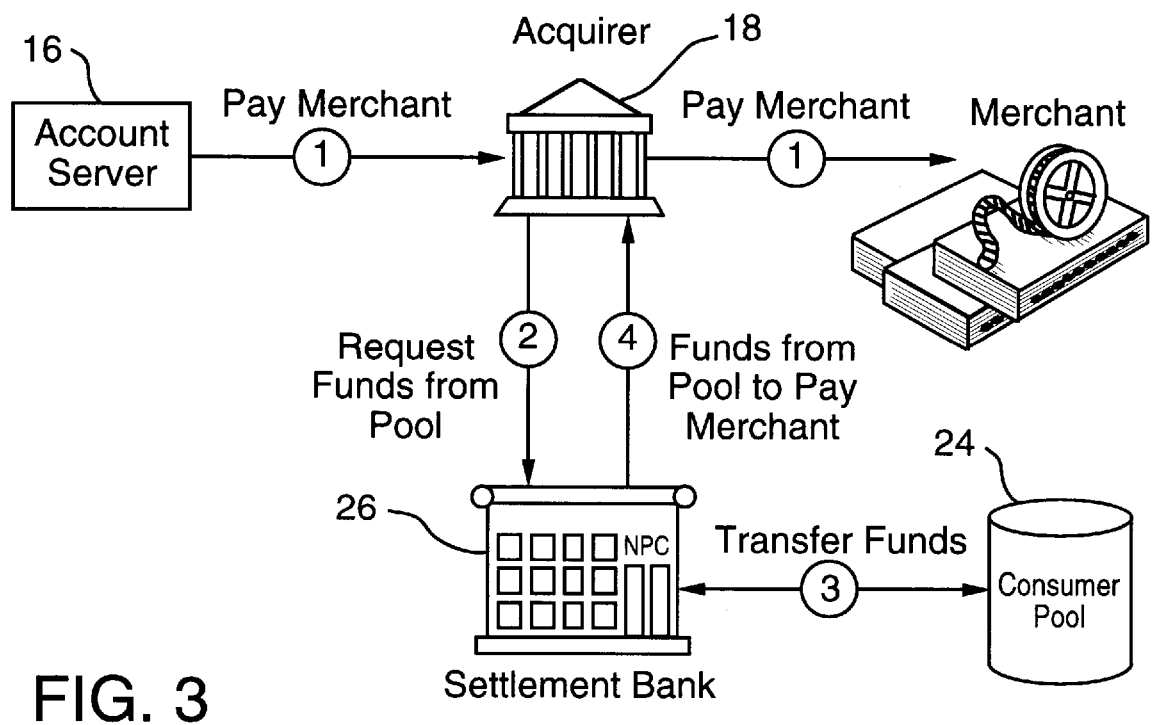
FIG. 3 illustrates the flow of payment to the merchant.

FIG. 3 illustrates the flow of payment to the merchant after a transaction, after a series of transactions, or after a predetermined time. Based upon a payment threshold established between the merchant, the account server 16, and the merchant's financial institution 18, notification will be sent at step 1 to the merchant's financial institution 18 to pay the merchant for the digital good(s) provided by the merchant. The payment threshold may be a specified time or after a specified amount is reached. Notification to the financial institution 18 specifying which merchant to pay and the payment amount can be forwarded via a local network or the network 14. The payment amount can be an aggregate total of all goods sold which meet the agreed upon payment threshold.

At step 2, a request is made from institution 18 to settlement bank 26 to transfer the requested funds. At step 3, the funds are transferred from a consumer pool 24 to the settlement bank 24. At step 4, the funds are transferred from the settlement bank 26 to the merchant's financial institution 18 which credits the merchant's account. The account server 16 will flag the merchant's account as having been paid for a given merchant cycle.

CUSTOMER APPLICATION SOFTWARE 20
AND MERCHANT APPLICATION
SOFTWARE 22

The present invention anticipates a layered approach for the client application software 20 which supports Internet commerce. At the lowest level, the checkbook library 30 is provided with a well-defined API which can be integrated with any type of customer to support various types of transactions. In the case of the WWW, we anticipate using the money tool 29, which is a module that interfaces with a WWW browser as an example of an application program 20. The money tool 29 incorporates the checkbook library 30 and adds other functionality, including transaction status reporting and a running tally of expenditures during a session.

User Account administration can be accomplished using the application software 20 and a user account administration server (not shown). The money tool 29 and checkbook library 30 will provide a general purpose security capability for secure interactions with the administrative server.

The merchant application software is supplied in conjunction with the merchant server 12. To allow for flexibility in the type of product sold and the way the products are sold, the application software 22 may use modules provided by the merchant that are specific to the merchant's needs. Standard API's allows merchant supplied modules to be easily integrated with the application software. To facilitate easy start up, however, source code for sample merchant modules may be supplied.

DETAILED DESCRIPTION OF A TRANSACTION FOR THE CASE OF A WEB BROWSER AND MERCHANT SERVER

Figure 4:
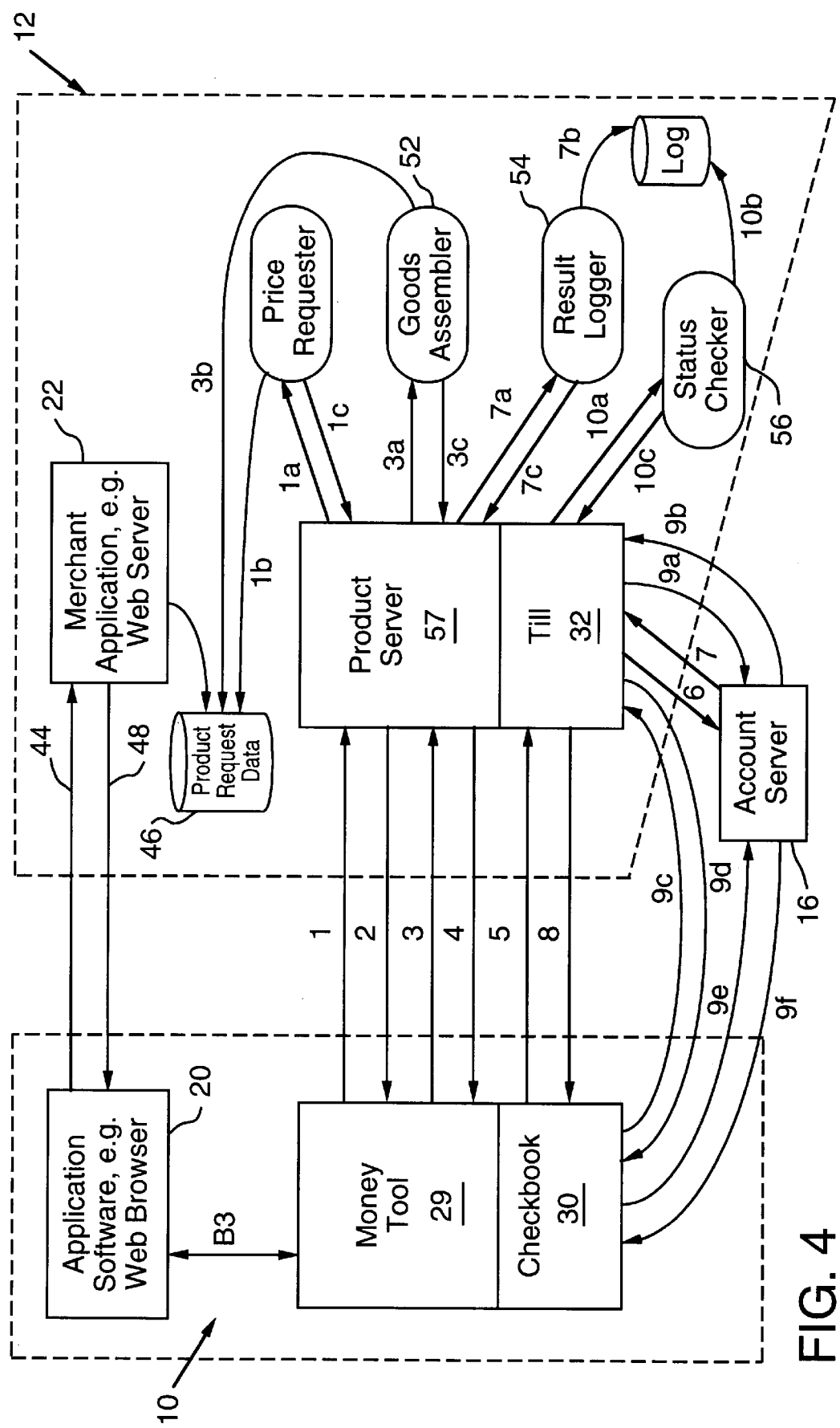
FIG. 4 illustrates the functions of the merchant software in the context of the transaction of FIG. 2.

The following description of FIG. 4 assumes a familiarity with a transaction as described above in conjunction with FIG. 2. The following description illustrates in more detail the merchant server 12 actions, merchant application software 22 operation, and information flow within the transaction.

In FIG. 4, all communication between the customer money tool 29 and customer application software/WWW browser 20 takes place through the checkbook library 30 and all communication between the money tool 29 and the merchant application software 22 takes place through the till library 32. The till library 32 may be integrated with the merchant application software 22 or may be included as part of a separate software component 57 which we call the product server. The money tool 29 and merchant application software 22 never communicate directly. FIG. 4 shows the flow for a full transaction. The flow would be shorter, but similar, for other delivery types discussed below.

When a customer sees a link in the application software/WWW browser 20 to an item the customer wants to buy, the customer clicks on it. That sends a message 44 to merchant application software 22 which may include web server software residing on the merchant server 12. The merchant application software 22 stores any information needed for later processing of the request into a data structure denoted as a product request data (PRD) structure 46. The data structure 46 includes, for example, such information as what files make up the request or the query string to be run against a database. The merchant server 12 then returns to the aplication software/WWW browser 20 a message 48 that includes the name of the machine where the till software 32 is running and a handle to the PRD. The application software/WWW browser 20 passes the information to the money tool 29.

Alternatively, as the user browses and clicks on a purchasable item, a URL, or form which itself contains all the relevant PRD, can be passed directly from the application software/WWW browser 20 to the money tool 29, obviating the round trip via messages 44 and 48. The PRD would then be included in the authenticated price request 34 to the till software 32. Under that option, the PRD is not stored in shared memory or files between the merchant application software 22 and merchant server 12, thus permitting the till library 32 and associated software 57, if desired, to run on a separate platform from the merchant application software 22.

Notation

We use the following notation to denote cryptographic operations. X and Y represent communicating parties. K represents a decryption or cipher key. C represents the customer, M the merchant, and N the account server 16.

$T_{XY}$(Identity) A Kerberos ticket proving to Y that X is named by Identity, and establishing a session key XY shared between them.

CC(Message) A cryptographic checksum of Message, using an algorithm such as the Secure Hash Algorithm (SHA) hash function.

$E_K$(Message) Message, encrypted by a symmetric cipher using key K. The key K may be denoted as XY, meaning that it is known only to parties X and Y. The encrypted message implicitly includes a nonce.

$E_{X-PUB}$(Message) Message, encrypted in party X's public key using the RSA cryptosystem.

$E_{X-PRI}$(Message) Message, encrypted in party Y's private key using RSA.

$[Message]_X$ Message, clearsigned by X using RSA public key cryptography. Clearsigning is implemented by forming Message, Timestamp, $E_{X-PRI}$ (CC (Message, Timestamp)). This is computationally efficient and allows any party to read the Message text without needing X's public key. The clearsigned item implicitly includes a nonce.

$[Message]_{X-DSA}$ Message, signed and timestamped by X using a Digital Signature Algorithm (DSA).

$\{message\}^X$ Message, encrypted for X using RSA public key cryptography. For computational efficiency, this is implemented by forming $E_K$(Message), $E_{X-PUB}$(K). The encrypted message imp licitly includes a nonce.

The Price Request Phase

This section assumes possession of tickets. A method for obtaining tickets is described below. The Identity item may actually be a pseudonym, as shown below in the section entitled Identities and Authentication.

| Step 1. | C => M | $T_{CM}$(Identity), $E_{CM}$(Credentials, PRD, Bid, RequestFlags, TID) |
|---------|--------|-------------------------------------------------------------------------|
| Step 2. | M => C | $E_{CM}$(ProductID, Price, RequestsFlags, TID) |

Those two steps represent a request/response message pair in which the customer requests a price quote of the merchant. The customer presents an identifying ticket (the identity presented may be a pseudonym as discussed below) to the merchant, along with some optional credentials establishing membership in groups which may make the customer eligible for a discount.

The customer passes parameters indicating Product Request Data (PRD, an arbitrary stream of application-specific data which the customer and merchant use to specify the goods) and some flags. Those RequestFlags are the customer's indication of the customer's request for the disposition of the transaction (i.e., delivery instructions).

The Transaction ID, TID, is optional in step 1. Steps 1 and 2 may be repeated as needed until the customer and merchant can agree on a price. The TID is present to indicate to the merchant that this is a repeated request.

The merchant stores the PRD for later use in delivering the goods, generates a new set of RequestFlags based on its response to the customer's RequestFlags, and generates a price quote and a TID (if one was not supplied in step 1) to identify this transaction in later steps. The TID is not globally unique. The TID is used only by the customer and merchant to maintain context between them.

The ProductID returned by the merchant in step 2 is a human-readable product description that will appear on the customer's account statement.

The Goods Delivery Phase

Once the customer and merchant have negotiated a price for the goods in question, the customer directs the merchant to deliver the goods by supplying the TID that was used in the price request phase:

$$C \rightarrow M \; T_{CM}(\text{Identity}), E_{CM}(\text{TID}) \quad \text{Step 3.}$$

The product server software 57 asks a goods assembler 52 to assemble the product at step 3a. The goods assembler 52 uses the handle to the PRD to look up at step 3b the information the merchant application 22 stored and uses that information to assemble the goods. That may involve doing a database query or packing multiple files into one chunk for shipping to the money tool 29. The assembled goods are returned at step 3c to the product server software 57.

$$M \rightarrow C \; E_K(\text{Goods}), E_{CM}(CC(E_K(\text{Goods})), \text{EPOID}) \quad \text{Step 4.}$$

The merchant generates a unique symmetric cipher key K, encrypts the goods using the key and sends the encrypted goods to the customer along with the first cryptographic checksum computed on the encrypted goods, so that the customer will immediately detect any discrepancy before proceeding. The merchant also sends an electronic payment order ID, or EPOID, 50 (See FIG. 10) with the encrypted goods.

The EPOID 50 is a globally unique identifier which will be used in the account server's 16 database to uniquely identify this transaction. It may include, for example, the following information: merchant identifier, a timestamp marking the time at the end of goods delivery, and a serial number to guarantee uniqueness.

The specification that the EPOID 50 be globally unique is used to prevent replay attacks, in which unscrupulous merchants reuse customers' old signed payment instructions. The timestamp portion of the EPOID 50 is used to expire stale transactions. The timestamp should be generated at the end of goods delivery because the delivery (especially for very large goods) may take longer than the payment expiration time.

The Payment Phase $$C \rightarrow M \; T_{CM}(\text{Identify}), E_{Cm}([\text{EPO}]_c) \quad \text{Step 5.}$$

After the encrypted goods are delivered, the customer submits payment to the merchant in the form of the signed EPO 40. At any time before the signed EPO 40 is submitted, a customer may abort the transaction and be in no danger of its being completed against the customer's will. The submission of the signed EPO 40 marks the "point of no return" for the customer.

An EPO 40 consists of two sections, a clear part containing transaction information which is readable by the merchant and the account server 16, and an encrypted part containing payment instructions which is readable only by the account server 16. The clear part of the EPO 40 includes, in addition to the information shown in FIG. 8, A cryptographic checksum of the Product Request Data (from step 1), to forestall debate over the details of the order.

The cryptographic checksum of the customer's account number with an account verification nonce, so that the merchant may verify that any supplied credentials were used correctly.

The globally-unique EPOID.

The second checksum is used to forestall debate over the content of the goods or whether they were received completely and correctly.

The encrypted part of the EPO 40 includes:

A ticket proving the customer's true identity

Any required authorization tokens as discussed below.

The customer's account server 16 account number.

The account verification nonce.

A customer memo field.

The EPO 40 is a tuple:
Identity,
Product ID,
Price,
M,
$CC(E_K(\text{Goods}))$,
CC(PRD),
CC(CAcct, AcctVN),
EPOID,
$T_{CM}(\text{TrueIdentity})$,
$E_{CM}(\text{Authorization}$,
CAcct,
AcctVN,
CMemo)

$$M \rightarrow N \; T_{NM}(M), E_{NM}([[\text{EPO}]_c, \text{Macct, Mmemo, K}]_M) \quad \text{Step 6.}$$

After the customer presents the signed EPO 40 to the merchant, the merchant endorses it to create the countersigned EPO 42 shown in FIG. 9. The countersigned EPO 42 is sent to the account server 16. The countersigned EPO 42 adds the merchant's account number, the merchant's memo field, and the goods decryption key, as well as the merchant's signature:

$$[[\text{EPO}]_C, \text{Macct, Mmemo, K}]_M$$

At any time before the countersigned EPO 42 is submitted to the account server 16, the merchant may abort the transaction and be in no danger of its being completed against his will. The submission of the countersigned EPO 42 marks the "point of no return" for the merchant Upon receipt of the countersigned EPO 42, the account server 16 reviews the information and makes a decision about the transaction. The account server 16 makes its decision based on verification of the signatures, the privileges of the users involved, the customer's account balance, and the uniqueness and freshness of the EPOID 50. If all information checks out, the account server 16 transfers the amount of the purchase from the customer's account to the merchant's account. The account server 16 then issues a message, which acts as a receipt, containing the result code, the identities of the parties, the price and description of the goods, the EPOID, and the key K needed to decrypt the goods. The receipt is digitally signed by the account server 16, using the Digital Signature Algorithm (DSA). The receipt is denoted:

Result, Identity, Price, ProductID, M, K, EPOID

For that step, DSA is used rather than RSA because of its relative performance. While RSA signatures may be verified quickly, they are time-consuming to create; DSA signatures, on the other hand, may be created quickly. By using RSA for customer and merchant signatures and DSA for account server 16 signatures, we may shift some computing load away from the account server 16.

Some of the resulting burden on the merchant can be lifted by recognizing that, from a business risk perspective, it may be sufficient for a merchant to verify only a random sample of receipts signed by the account server 16. Because integrity and authenticity are assured by the symmetric key encryption protocol, only accountability is at stake.

| Step 7. | N => M | $E_{CM}([Receipt]_{N\text{-}DSA},$ $E_{CN}(EPOID, CAcct, Bal, Flags))$ |
|---|---|---|

The receipt is returned to the merchant, along with an indication of the customer's new account balance (encrypted so that only the customer may read it). The EPOID 50 is repeated in the customer-specific data to ensure that the merchant cannot replay data from an earlier transaction. The product server software 57 sends the receipt to a result logger 54 at step 7a which logs the information in step 7b and informs the product server software 57 when the logging is completed at step 7c.

The Flags included in the customer-specific data indicate simple messages from the account server 16 to the customer. For example, one message could be that the account balance has reached a "low-water mark" and should be replenished soon.

| Step 8. | M => C | $E_{CM}([Receipt]_{N\text{-}DSA},$ $E_{CN}(EPOID, CAcct, Bal, Flags))$ |
|---|---|---|

In step 8, the merchant responds to the request from the customer in step 5, forwarding the messages returned by the account server 16 in step 7.

STATUS QUERY EXCHANGE

In the event of communications failure after step 5 of the transaction, the customer or merchant may be unaware of the transaction's status. (Before step 5, the transaction may be aborted with no difficulty, as no parties have yet signaled their commitment.) The invention supports a status query exchange for delivery of the necessary information.

The request and response proceed as one of the following exchanges, assuming the information is available. In each case, an alternate response is possible, indicating that the queried party does not have the requested information (possibly indicating why).

The merchant requests the transaction status from the account server 16:

| Step 9a | M => N | $T_{MN}(M), E_{MN}(EPOID)$ |
|---|---|---|
| Step 9b | N => M | $E_{MN}([Receipt]_{N\text{-}DSA},$ $E_{CN}(EPOID, CAcct, Bal, Flags))$ |

The customer requests the transaction status from the merchant:

| Step 9c | C => M | $T_{CM}(Identity), E_{CM}(EPOID)$ |
|---|---|---|
| Step 9d | M => C | $E_{CM}([Receipt]_{N\text{-}DSA},$ $E_{CN}(EPOID, CAcct, Bal, Flags))$ |

The product server software 57 asks the status checker 56 in step 10a what the results of the transaction were. The status checker 56 in step 10b checks the log and returns the result, including the key, if the transaction was successful, to the product server software 57 in step 10c, which passes the information back to the money tool in step 9d.

The customer requests the transaction status from the account server 16:

| Step 9e | C => N | $T_{CN}(TrueIdentity), E_{CN}(EPOID)$ |
|---|---|---|
| Step 9f | N => C | $E_{CN}([Receipt]_{N\text{-}DSA},$ $EPOID, CAcct, Bal, Flags)$ |

The customer requests the transaction status from the merchant for a non-account server 16 transaction (see below):

| Step 1. (not shown) | C => M | $T_{CM}(Identity), E_{CM}(EPOID)$ |
|---|---|---|
| Step 2. (not shown) | M => C | $E_{CM}(Result, K)$ |

That concludes the description of FIG. 4.

IDENTITIES AND AUTHENTICATION

The following sections are also discussed in a paper by certain of the inventors entitled "Net Bill Security and Transaction Protocol" which is available at http://www.ini.cmu.edu/~thoth/papers/Usenix.ps and which is hereby incorporated by reference.

When a customer creates an account server 16 account, the customer receives a unique User ID and generates the RSA public key pair associated with that User ID. That key pair is certified by account server 16, and is used for signatures and authentication within the system.

Earlier, we showed how those signatures are used in the payment phase of the transaction. However, the transaction may also use Kerberos tickets. The transaction involves several phases, for price negotiation, goods delivery, and payment. Only the last of those phases requires nonrepudiable signatures. Instead of using public key cryptography for message authentication and encryption throughout the transaction, we use symmetric cryptography because it offers significant performance advantages. We use the public key cryptography infrastructure to alleviate problems with traditional symmetric-key Kerberos.

Kerberos uses a two-level ticket scheme. To authenticate oneself to a Kerberos service, one must obtain a service ticket, which establishes a shared symmetric session key between the client and server, and establishes that the Kerberos Ticket Granting Server believes the client's identity. To obtain a service ticket, a client must first obtain a ticket-granting ticket (or TGT), which proves the client's identity to the Ticket Granting Server. A client obtains a TGT via request from a Key Distribution Center, or KDC.

The Kerberos KDC/TGT arrangement introduces two significant problems that we may alleviate using public key cryptography. First, because it maintains a shared symmetric cipher key with every principal in the system, it is an attractive target for attack. Recovering from compromise of the KDC requires establishing new shared keys with all users of the system. Second, a KDC and TGT will be a communications or processing bottleneck if a large number of users present a heavy traffic load.

To eliminate the Ticket Granting Server, we replace the TGT with a public key certificate, allowing each service to act as its own Ticket Granting Server. That is, a user presents a service ticket request encrypted with a certified public key (we call this a Public Key-based TGT, or PKTGT), and receives in response a symmetric-cipher-based service ticket. This service ticket is identical in form to a Kerberos service ticket. The Key Distribution Center is replaced by a key repository. The protocol for a customer to obtain a service ticket for a merchant M is as follows (before this step occurs, the customer requests the merchant's public key certificate over any available channel—such as an unsecured remote procedure call):

1. C => M  [{Identity, M, Timestamp, K}$^M$]$_C$
2. M => C  $E_K(T_{CM}$(Identity), CM)

That model preserves the efficiency of symmetric ciphers for most communication and repeated authentication, and isolates the computational expense of public key cryptography to initial authentication between parties. We refer to this model as "Public Key Kerberos," or "PK Kerberos."

In the preset invention, a customer obtains Kerberos tickets for the account server 16 at the beginning of a session and obtains Kerberos tickets for merchants as the customer needs them. Merchant servers will continually maintain their own tickets for the account server 16.

Key Repository

Private keys are large, so users cannot be expected to remember them. Permanently storing private keys at a user's workstation poses security risks and restricts the user's electronic commerce activities to a single workstation. The present invention uses a key repository to optionally store customers' private keys. Those keys are encrypted by a symmetric key derived from a passphrase known only to the customer.

Key Validation and Revocation Certificates

We use a public key certificate scheme to bind User IDs to keys, with the account server 16 as the certifying authority. The account server 16 generates a certificate when a customer first proves the customer's identity and begins using the account server 16. However, allowing merchants, as services, to grant their own tickets based on these certificates poses a problem. The account server 16 is no longer involved in ticket-granting and cannot prevent a ticket from being issued to a user with a compromised key. The account server 16 needs to invalidate compromised keys as quickly as possible.

The account server 16 maintains a Certificate Revocation List (CRL). When a key is compromised, the owner creates a Revocation Certificate and places it in the key repository along with the key. Any party can check that a given key has not been compromised by examining the revocation list.

Initially, it would seem that it is necessary for the customer and merchant to contact the account server 16 to check CRLs on each transaction. However, it is possible to eliminate that check by allowing the account server 16 to do such a check when it processes the payment transaction. By delaying the CRL check to late in the transaction, we introduce some minor risks. Customers and merchants may disclose information such as their preference for particular items or special prices to bogus peers, but there is no financial risk.

Pseudonyms

Some customers want to disguise their identities. The present invention provides two pseudonym methods to protect the privacy of the customer's identity: a per-transaction method that uses a unique pseudonym for each transaction, and a per-merchant method that uses a unique pseudonym for each customer-merchant pair. The per-merchant pseudonym is useful for customers who wish to maintain a consistent pseudonymous identity to qualify for frequent-buyer discounts.

These pseudonym schemes are implemented by introducing a pseudonym-granting server, P, to create pseudonymous PKTGTs for the customer. The protocol for obtaining and using a pseudonymous PKTGT is as follows. The customer obtains the pseudonymous PKTGT in steps 1–2, and uses it with a merchant in steps 3–4 exactly as the customer would use a normal PKTGT:

1. C => P  [{TrueIdentity, M, Timestamp, K1, Type}$^P$]$_C$
2. P => C  $E_{K1}$(K2, [{Pseudonym, M, Timestamp, K2}$^M$]$_P$, [TrueIdentity, M, Pseudonym, Timestamp]$_P$)
3. C => M  [{Pseudonym, M, Timestamp, K2}$^M$]$_P$
4. M => C  $E_{K2}(T_{CM}$(Pseudonym), CM)

The transaction is the same for both kinds of pseudonyms; the desired type of pseudonym (per-merchant or per-transaction) is indicated in the Type field in step 1. The extra message [TrueIdentity, M, Pseudonym, Timestamp]$_P$ in step 2 is the customer's receipt proving that the customer was using the pseudonym Pseudonym with the named merchant at the time indicated. This may be useful to the customer in conjunction with the receipt received in step 8 of the transaction (which contains only the pseudonym) to later prove that the customer was involved in the transaction.

Credentials and Authorizations

A restricted proxy is a ticket giving the bearer authority to perform certain operations named in the ticket. The present invention uses a similar construct to implement credentials to prove group membership (to allow merchants to provide discounts to special groups) and to implement access control mechanisms.

Credentials for Group Membership

An organization can provide a credential server which issues credential proxies proving membership in a group. In this case, the credential server is asserting a fact (membership in a group) about which it is authoritative. For example, an auto club may provide a credential server which issues credentials to the members of the club. Merchants who offer discounts to the club's members will accept those credentials as proof of membership. The protocol for obtaining a credential (assuming the customer has already obtained a service ticket for the credential server) from a credential server, G, is as follows:

1. C => G  $T_{CG}$(Identity), $E_{CG}$(Group, CAcct)
2. G => C  $E_{CG}$([Group, Detail, Identity, CC(CAcct, AcctVN), Timestamp]$_G$, AcctVN)

Credentials obtained in that manner are presented to merchants in the price request phase of the transaction protocol, step 1.

A credential issued to a customer may be unrestricted, or it may optionally be restricted for use on a specific account, for example, to prevent corporate employees from taking advantage of corporate discounts for personal purchases. That is accomplished by passing the account number to the group server as part of the request. If the account number is appropriate for the group the credential will be issued. The credential contains a cryptographic checksum of the account number and an "Account Verification Nonce," which is also returned to the customer along with the credential.

The nonce is a pseudonym number ensuring that merchants can neither determine which different customers (or the same customer in repeated sessions) are using the same account nor easily verify guesses of the customer's account number. The nonce is passed along to the account server 16 in the encrypted part of the EPO so that the account server 16 can verify that the checksum passed to the merchant (for his comparison to the credential) corresponds to the account number actually being used.

The Detail field allows a credential server to include additional information in a format specific to the credential server. That would allow, for example, a multiple-journal subscription credential server to issue a single credential for all subscribers, using the Detail field to specify which journal subscriptions the customer holds.

Credentials can also be used by cooperating merchants to restrict information access. In that way, merchants only sell to approved customers, i.e., those who can present a certain credential. That offers a solution for merchants who, for example, can restrict distribution of sensitive documents only to individuals whose credentials verify a need-to-know.

Access Control Mechanism

An account owner (such as a parent) may have a restriction on the account such that no purchases can be completed by a given customer (such as a child) without approval from an access control server. That allows different organizations to provide access control services. For example, both the PTA and a church group could offer competing access control services.

To obtain an access control authorization, a customer C must present details of a specific transaction to the access control server A, who grants a single-use proxy authorizing the given transaction. The protocol is as follows:

| | |
|---|---|
| 1. C => A | $T_{CA}$(Identity), $E_{CA}$(M, ProductID, Price, CC($E_K$(Goods)), EPOID, CAcct) |
| 2. A => C | $E_{CA}(E_{A\text{-}PRI}$(CC(Identity, M, ProductID, Price, CC($E_K$(Goods), EPOID, CAcct))) |

The item returned in step 2 is the Authorization item used in step 5 of the transaction protocol (see Payment Phase, supra).

Modifications And Variations Handling Zero-Priced Goods

We anticipate that many transactions will be for subscription goods, i.e., goods for which the customer's marginal price is zero. With zero-priced goods, fraud is less important, and so we make several refinements to make our transaction more efficient in such cases.

First, we include a flag in the RequestFlags field of the price request (step 1) informing the merchant "If the price for this product is zero, treat this message as an automatic request for the goods."

Zero-priced transactions do not need to go through the account server 16, as long as both parties agree. We can put another flag in the RequestFlags that informs the merchant "I require an account server 16 receipt for this transaction." If that flag is present, the merchant must submit the transaction to the account server 16, even if the price is zero. (The merchant may also decide to submit a zero-price transaction to the account server 16.)

A customer or merchant may want to use the account server 16 on a zero-priced transaction if they require a signed receipt from a third party confirming the transaction. While subscription goods may not require a receipt, a merchant may decide to put a zero-priced purchase through account server 16 in a "buy ten, get one free" situation so as to be able to prove that he actually provided the free item.

The merchant may change his price quote depending on that flag. For example, if the account server 16 charges the merchant for billing services, the merchant may want to recover that cost if the customer requests an account server 16 receipt for what might otherwise be a zero-priced transaction.

Combinations of the aforementioned flags allow us to support four basic types of zero-priced delivery:

Type I: Zero-Priced Certified Delivery

This transaction eliminates the separate product request phase. Because steps 2 and 4 from the original transaction are combined, we indicate that by making steps 2 and 4 into a single step labeled 2/4.

| | |
|---|---|
| 1. C => M | $T_{CM}$(Identity), $E_{CM}$(Credentials, PRD, Bid, RequestFlags, TID) |
| 2/4. M => C | $E_{CM}$(ProductID, Price (=0), RequestFlags, TID, $E_K$(Goods)), $E_{CM}$(CC($E_K$(Goods)), EPOID) |
| 5. C => M | $T_{CM}$(Identity), $E_{CM}$([EPO]$_C$) |
| 6. M => N | $T_{MN}$(M), $E_{MN}$([[EPO]$_C$, MAcct, MMemo, K]$_M$) |
| 7. N => M | $E_{MN}$([Receipt]$_{N\text{-}DSA}$, $E_{CN}$(EPOID, CAcct, Bal, Flags)) |
| 8. M => C | $E_{CM}$([Receipt]$_{N\text{-}DSA}$, $E_{CN}$(EPOID, CAcct, Bal, Flags)) |

Type II: Certified Delivery Without Account Server 16

This transaction modifies Type I by further eliminating the call to the account server 16. With that modification, the payment phase becomes little more than an acknowledgment.

| | |
|---|---|
| 1. C => M | $T_{CM}$(Identity), $E_{CM}$(Credentials, PRD, Bid, RequestFlags, TID) |
| 2/4. M => C | $E_{CM}$(ProductID, Price (=0), RequestFlags, TID, $E_K$(Goods)), $E_{CM}$(CC($E_K$(Goods)), EPOID) |
| 5. C => M | $T_{CM}$(Identity), $E_{CM}$(EPOID, CC($E_K$(Goods))) |
| 8. M => C | $E_{CM}$(Result, K) |

Type III: Verified Delivery

This transaction is nearly the same as the Type II transaction, except that the goods are encrypted in the shared session key CM. That bypasses the certified delivery mechanism, allowing the customer's software to begin streaming the goods to a viewer rather than being obliged to wait until all the goods have been delivered before receiving the key.

| | |
|---|---|
| 1. C => M | $T_{CM}$(Identity), $E_{CM}$(Credentials, PRD, Bid, RequestFlags, TID) |
| 2/4. M => C | $E_{CM}$(ProductID, Price (=0), RequestFlags, TID, Goods, CC(Goods), EPOID) |
| 5. C => M | $T_{CM}$(Identity), $E_{CM}$(EPOID, CC(Goods)) |
| 8. M => C | $E_{CM}$(Result) |

Type IV: Unverified Delivery

This transaction modifies Type III by eliminating the acknowledgment of goods delivery in the payment phase if the merchant does not need it.

| | |
|---|---|
| 1. C => M | $T_{CM}$(Identity), $E_{CM}$(Credentials, PRD, Bid, RequestFlags, TID) |

| | | |
|---|---|---|
| 2/4. M => C | $E_{CM}$(ProductID, Price (=0), RequestFlags, TID, Goods, CC(Goods)) | |

CONCLUSION

The present invention introduces new methods for delivery, access control, user certificates, pseudonyms, and their integration in commercial transaction over a network. While the present invention has been described in conjunction with a preferred embodiment thereof, those of ordinary skill in the art: will recognize that many modifications of the present invention may be implemented. The foregoing description and the following claims are intended to cover all such modifications and variations

What is claimed is:

1. A method for purchasing and delivering digital goods over a network, comprising the steps of:
    identifying a digital good to be purchased;
    establishing a purchase price for the digital good;
    sending a purchase request to the merchant for the digital good;
    encrypting the digital good;
    calculating a first cryptographic checksum for the encrypted good;
    transmitting the encrypted digital good and a timestamp to the customer;
    receiving the encrypted digital good and the timestamp;
    calculating a second cryptographic checksum for the received encrypted digital good;
    creating an electronic payment order containing information identifying the transaction, the second cryptographic checksum, and the timestamp;
    transmitting the electronic payment order to the merchant;
    adding an electronic signature of the merchant and a decryption key to the electronic payment order when the first and second checksums match;
    submitting the merchant signed electronic payment order and key for review;
    reviewing the information in the electronic payment order and sending a message to the merchant in response to the review; and
    forwarding a message containing the key to the customer when the review is positive.

2. The method of claim 1 wherein said step of establishing a purchase price includes the step of negotiating a purchase price.

3. The method of claim 1 wherein said step of establishing a purchase price includes the step of looking up a purchase price from a list.

4. The method of claim 1 wherein said step of establishing a purchase price includes the step of identifying the customer, and wherein the price is established in part on the identity of the customer.

5. The method of claim 4 additionally comprising the step of determining the customer's frequency of purchases, and wherein the price is established in part on the customer's frequency of purchases.

6. The method of claim 4 additionally comprising the steps of presenting a credential and evaluating the credential before establishing the purchase price.

7. The method of claim 4 additionally comprising the steps of presenting a coupon and evaluating the coupon before establishing the purchase price.

8. The method of claim 1 wherein said step of sending a purchase request includes sending a customer identifier and a digital good identifier.

9. The method of claim 1 wherein said step of creating an electronic payment order includes an electronic payment order having a digital signature of the customer.

10. The method of claim 9 wherein said step of creating an electronic payment order includes an electronic payment order having a customer identifier, a digital good identifier, the purchase price, and a merchant identifier.

11. The method of claim 10 wherein said step of creating an electronic payment order includes an electronic payment order having a customer account number and a customer memo field.

12. The method of claim 1 additionally comprising the steps of:
    retransmitting the encrypted digital good and a timestamp to the customer when the first and second checksums do not match;
    receiving the retransmitted encrypted digital good and the timestamp;
    calculating a second cryptographic checksum for the received retransmitted encrypted digital good;
    creating an electronic payment order containing information identifying the transaction, the second cryptographic checksum, and the timestamp; and
    transmitting the electronic payment order to the merchant.

13. The method of claim 1 additionally comprising the step of aborting the purchase.

14. The method of claim 13 wherein said step of aborting the purchase is performed when the first and second checksums do not match.

15. The method of claim 1 wherein the electronic payment order includes a digital signature of the customer, and wherein said step of reviewing the information includes the step of verifying the customer's signature and the merchant's signature.

16. The method of claim 1 wherein said step of reviewing the information includes the step of verifying that the customer has the funds needed to make the purchase.

17. The method of claim 1 wherein said step of reviewing the information includes the step of verifying that the customer has the credit needed to make the purchase.

18. The method of claim 1 wherein said step of reviewing the information includes the step of verifying that the customer is authorized to make the purchase.

19. The method of claim 1 wherein the timestamp is generated so as to be fresh at the end of the transmission of the encrypted digital good.

20. The method of claim 19 wherein said step of reviewing the information includes the step of reviewing the timestamp to determine if the transaction is stale.

21. The method of claim 1 additionally comprising the step of adding a unique serial number to the electronic payment order, and wherein said step of reviewing the information includes the step of reviewing the serial number.

22. The method of claim 1 additionally comprising the steps of:
    debiting the customer's account;
    crediting the merchant's account;
    logging the transaction; and
    saving a copy of the key.

23. The method of claim 1 additionally comprising the step of transmitting the first cryptographic checksum to the customer, and wherein the customer compares the first and second checksums.

24. The method of claim 1 wherein said step of forwarding a message containing the key is performed by the merchant.

25. The method of claim 24 additionally comprising the step of the information reviewer forwarding a message containing the key to the customer when the merchant fails to forward the message.

26. The method of claim 1 wherein said step of forwarding a message containing the key is performed by the information reviewer.

27. The method of claim 1 wherein the digital good includes a digitized receipt for a nondigital good.

28. The method of claim 1 wherein the message sent in response to the review includes a message having a digital signature of the reviewer.

29. A method for purchasing and delivering digital goods over a network, comprising the steps of:

(a) identifying a digital good to be purchased;

(b) sending a message indicating what price for the digital good is acceptable to the customer;

(c) determining if the price is acceptable to the merchant, and when the price is acceptable:

(d) encrypting the digital good;

(e) calculating a first cryptographic checksum for the encrypted good;

(f) transmitting the encrypted digital good and a timestamp to the customer;

(g) receiving the encrypted digital good and the timestamp;

(h) calculating a second cryptographic checksum for the received encrypted digital good;

(i) creating an electronic payment order containing information identifying the transaction, the second cryptographic checksum, and the timestamp;

(j) transmitting the electronic payment order to the merchant;

(k) adding an electronic signature of the merchant and a decryption key to the electronic payment order when the first and second checksums match;

(l) submitting the merchant signed electronic payment order and key for review;

(m) reviewing the information in the electronic payment order and sending a message to the merchant in response to the review; and (n) forwarding a message containing the key to the customer when the review is positive.

30. The method of claim 29 additionally comprising the step of aborting the transaction if the price is not acceptable to the merchant.

31. The method of claim 29 additionally comprising the steps of negotiating a price when the price in the message is not acceptable to the merchant, and performing steps (d) through (n) when a price has been agreed upon.

32. The method of claim 29 additionally comprising the step of identifying the customer before determining if the price is acceptable to the merchant.

33. The method of claim 32 additionally comprising the steps of presenting a credential and evaluating the credential before determining if the price is acceptable to the merchant.

34. The method of claim 32 additionally comprising the steps of presenting a coupon and evaluating the coupon before determining if the price is acceptable to the merchant.

35. The method of claim 29 wherein said step of sending a message includes sending a message including a customer identifier and a digital good identifier.

36. The method of claim 29 wherein said step of creating an electronic payment order includes creating an electronic payment order having a digital signature of the customer.

37. The method of claim 36 wherein said step of creating an electronic payment order includes an electronic payment order having a customer identifier, a digital good identifier, the purchase price, and a merchant identifier.

38. The method of claim 37 wherein said step of creating an electronic payment order includes an electronic payment order having a customer account number and a customer memo field.

39. The method of claim 29 additionally comprising the steps of:

retransmitting the encrypted digital good and a timestamp to the customer when the first and second checksums do not match;

receiving the retransmitted encrypted digital good and the timestamp;

calculating a second cryptographic checksum for the received retransmitted encrypted digital good;

creating an electronic payment order containing information identifying the transaction, the second cryptographic checksum, and the timestamp; and transmitting the electronic payment order to the merchant.

40. The method of claim 29 additionally comprising the step of aborting the purchase.

41. The method of claim 40 wherein said step of aborting the purchase is performed when the first and second checksums do not match.

42. The method of claim 29 wherein the electronic payment order includes a digital signature of the customer, and wherein said step of reviewing the information includes the step of verifying the customer's signature and the merchant's signature.

43. The method of claim 29 wherein said step of reviewing the information includes the step of verifying that the customer has the funds needed to make the purchase.

44. The method of claim 29 wherein said step of reviewing the information includes the step of verifying that the customer has the credit needed to make the purchase.

45. The method of claim 29 wherein said step of reviewing the information includes the step of verifying that the customer is authorized to make the purchase.

46. The method of claim 29 wherein the timestamp is generated so as to be fresh at the end of the transmission of the encrypted digital good.

47. The method of claim 46 wherein said step of reviewing the information includes the step of reviewing the timestamp to determine if the transaction is stale.

48. The method of claim 29 additionally comprising the step of adding a unique serial number to the electronic payment order, and wherein said step of reviewing the information includes the step of reviewing the serial number.

49. The method of claim 29 additionally comprising the steps of:

debiting the customer's account;

crediting the merchant's account;

logging the transaction; and saving a copy of the key.

50. The method of claim 29 additionally comprising the step of transmitting the first cryptographic checksum to the customer, and wherein the customer compares the first and second checksums.

51. The method of claim 29 wherein said step of forwarding a message containing the key is performed by the merchant.

52. The method of claim 51 additionally comprising the step of the information reviewer forwarding a message containing the key to the customer when the merchant fails to forward the message.

53. The method of claim 29 wherein said step of forwarding a message containing the key is performed by the information reviewer.

54. The method of claim 29 wherein the digital good includes a digitized receipt for a nondigital good.

55. The method of claim 29 wherein the price indicated in the message is zero.

56. The method of claim 29 wherein the message sent in response to the review includes a message having a digital signature of the reviewer.

57. A method for ordering and delivering digital goods over a network, comprising the steps of:
   (a) identifying a digital good to be delivered;
   (b) sending a message requesting delivery of the digital good if the price is zero;
   (c) determining if the price of the good is zero, and when the price of the good is zero:
   (d) encrypting the digital good;
   (e) calculating a first cryptographic checksum for the encrypted good;
   (f) transmitting the encrypted digital good and a timestamp to the customer;
   (g) receiving the encrypted digital good and the timestamp;
   (h) calculating a second cryptographic checksum for the received encrypted digital good;
   (i) creating an electronic payment order containing information identifying the transaction, the second cryptographic checksum, and the timestamp;
   (j) transmitting the electronic payment order to the merchant; and
   (k) reviewing the information in the electronic payment order and sending a message containing the key to the customer when the review is positive.

58. The method of claim 57 additionally comprising the step of aborting the transaction if the price of the goods is not zero.

59. The method of claim 57 wherein said step of reviewing the information includes the step of comparing the first and second cryptographic checksums.

60. The method of claim 57 additionally comprising the step of identifying the customer before determining if the price of the good is zero.

61. The method of claim 60 additionally comprising the steps of presenting a credential and evaluating the credential before determining if the price of the good is zero.

62. The method of claim 60 additionally comprising the steps of presenting a coupon and evaluating the coupon before determining if the price of the good is zero.

63. The method of claim 60 wherein said step of reviewing the information includes the step of verifying that the customer is authorized to receive the good.

64. The method of claim 57 wherein said step of sending a purchase request includes sending a purchase request having a customer identifier and a digital good identifier.

65. The method of claim 57 additionally comprising the steps of:
   retransmitting the encrypted digital good and a timestamp to the customer when the first and second checksums do not match;
   receiving the retransmitted encrypted digital good and the timestamp;
   calculating a second cryptographic checksum for the received retransmitted encrypted digital good;
   creating an electronic payment order containing information identifying the transaction, the second cryptographic checksum, and the timestamp; and
   transmitting the electronic payment order to the merchant.

66. The method of claim 57 additionally comprising the step of aborting the transaction.

67. The method of claim 66 wherein said step of aborting the transaction is performed when the first and second checksums do not match.

68. The method of claim 57 wherein the electronic payment order includes a digital signature of the customer, and wherein said step of reviewing the information includes the step of verifying the customer's signature.

69. The method of claim 57 wherein the timestamp is generated so as to be fresh at the end of the transmission of the encrypted digital good.

70. The method of claim 69 wherein said step of reviewing the information includes the step of reviewing the timestamp to determine if the transaction is stale.

71. The method of claim 57 additionally comprising the step of adding a unique serial number to the electronic payment order, and wherein said step of reviewing the information includes the step of reviewing the serial number.

72. The method of claim 57 additionally comprising the steps of:
   logging the transaction; and
   saving a copy of the key.

73. The method of claim 57 additionally comprising the step of transmitting the first cryptographic checksum to the customer, and wherein the customer compares the first and second checksums.

74. The method of claim 57 wherein the digital good includes a digitized receipt for a nondigital good.

75. The method of claim 57 wherein the message sent in response to the review includes a message having a digital signature of the reviewer.

76. A method for purchasing and delivering digital goods over a network, comprising the steps of:
   (a) identifying a digital good to be delivered;
   (b) sending a message requesting delivery of the digital good if the price is zero;
   (c) determining if the price of the good is zero, and when the price of the good is zero, then:
   encrypting the digital good under a session key shared with the customer;
   calculating a first cryptographic checksum for the encrypted good;
   transmitting the encrypted digital good and a timestamp to the customer;
   receiving the encrypted digital good and the timestamp;
   calculating a second cryptographic checksum for the received encrypted digital good;
   creating an electronic message containing information identifying the transaction, the second cryptographic checksum, and the timestamp;
   transmitting the electronic message to the merchant;
   reviewing the information in the electronic message; and
   sending a message to the customer indicating the results of the review.

77. The method of claim 76 wherein said step of reviewing the information in the electronic message includes comparing the first and second cryptographic checksums.

78. A method for purchasing and delivering digital goods over a network, comprising the steps of:

(a) identifying a digital good to be delivered;

(b) sending a message requesting delivery of the digital good if the price is zero, the message including a credential;

(c) determining if the price of the good is zero at least in part on the presented credential, and when the price of the good is zero:

encrypting the digital good under a session key shared with the consumer;

calculating a first cryptographic checksum for the encrypted good;

transmitting the encrypted digital good, the first cryptographic checksum, and a timestamp to the customer;

receiving the encrypted digital good, the first cryptographic checksum, and the timestamp;

calculating a second cryptographic checksum for the received encrypted digital good;

decrypting the encrypted digital good with the shared session key;

comparing the first cryptographic checksum to the second cryptographic checksum; and alerting the customer if the checksums don't match.

79. A method for purchasing and delivering digital goods over a network, comprising the steps of:

identifying a digital good to be purchased;

obtaining a credential containing a cryptographic checksum of a nonce, an account number, and a copy of the nonce;

establishing a purchase price for the digital good after the merchant is made aware of the credential;

sending a purchase request to the merchant for the digital good;

encrypting the digital good;

calculating a first cryptographic checksum for the encrypted good;

transmitting the encrypted digital good and a timestamp to the customer;

receiving the encrypted digital good and the timestamp;

calculating a second cryptographic checksum for the received encrypted digital good;

creating an electronic payment order containing information identifying the transaction, the second cryptographic checksum, the timestamp, the account number to be charged, the nonce, the cryptographic checksum of the nonce, and the account number copied from the credential used to establish the purchase price;

transmitting the electronic payment order to the merchant;

adding an electronic signature of the merchant, the credential, and a decryption key to the electronic payment order when the first and second checksums match;

submitting the merchant signed electronic payment order, credential, and key for review;

reviewing the submitted information and sending a message to the merchant in response to the review; and forwarding a message containing the key to the customer when the review is positive.

80. The method of claim 79 wherein said step of reviewing the information includes the step of determining if the customer is authorized to used the account identified in the credential.

81. The method of claim 79 wherein said step of obtaining a credential includes the step of specifying the account number to be used in the credential.

82. The method of claim 81 wherein said step of reviewing the information includes the step of determining if the account being charged is the same account as was specified when the credential was obtained.

83. The method of claim 79 wherein the account number and the nonce in the electronic payment order are encrypted so as to be readable only by the information reviewer.

84. A method of purchasing and receiving a digital good over a network, comprising the steps of:

creating a purchase request for a digital good;

transmitting the purchase request to a merchant;

receiving the digital good in encrypted form and a timestamp;

calculating a cryptographic checksum for the received encrypted digital good;

creating an electronic payment order containing information identifying the transaction, the cryptographic checksum, and the timestamp;

transmitting the electronic payment order to the merchant; and receiving a key for decrypting the encrypted digital good.

85. The method of claim 84 additionally comprising the step of negotiating a purchase price.

86. The method of claim 84 additionally comprising the step of identifying the customer to the merchant.

87. The method of claim 86 additionally comprising the step of presenting a credential to the merchant.

88. The method of claim 86 additionally comprising the steps of presenting a coupon to the merchant.

89. The method of claim 84 wherein said step of creating a purchase request includes a purchase request having a customer identifier and a digital good identifier.

90. The method of claim 84 wherein said step of creating an electronic payment order includes an electronic payment order having a digital signature of the customer.

91. The method of claim 90 wherein said step of creating an electronic payment order includes an electronic payment order having a customer identifier, a digital good identifier, the purchase price, and a merchant identifier.

92. The method of claim 91 wherein said step of creating an electronic payment order includes an electronic payment order having a customer account number and a customer memo field.

93. The method of claim 84 additionally comprising the step of aborting the purchase.

94. The method of claim 93 additionally comprising the steps of receiving a cryptographic checksum and comparing the calculated checksum to the received checksum.

95. The method of claim 94 wherein said step of aborting the purchase is performed when the received and calculated checksums do not match.

96. The method of claim 84 wherein the digital good includes a digitized receipt for a nondigital good.

97. Apparatus for purchasing and receiving a digital good over a network, comprising:

means for creating a purchase request for a digital good;

means for transmitting the purchase request to a merchant;

means for receiving the digital good in encrypted form and a timestamp;

means for calculating a cryptographic checksum for the received encrypted digital good;

means for creating an electronic payment order containing information identifying the transaction, the cryptographic checksum, and the timestamp;

said means for transmitting transmitting the electronic payment order to the merchant and said means for receiving receiving a key; and means responsive to said received key for decrypting the encrypted digital good.

98. A method of selling and delivering a digital good over a network, comprising the steps of:

receiving a purchase request for a digital good from a customer;

encrypting the digital good;

calculating a first cryptographic checksum for the encrypted good;

generating a timestamp;

transmitting the encrypted digital good and the timestamp to the customer;

receiving an electronic payment order from the customer containing information identifying the transaction, a second cryptographic checksum, and the timestamp;

adding an electronic signature of the merchant and a decryption key to the electronic payment order when the first and second checksums match; and transmitting the merchant signed electronic payment order and key for review.

99. The method of claim 98 additionally comprising the step of establishing a purchase price.

100. The method of claim 99 wherein said step of establishing a purchase price includes the step of negotiating a purchase price.

101. The method of claim 99 wherein said step of establishing a purchase price includes the step of looking up a purchase price from a list.

102. The method of claim 99 wherein said step of establishing a purchase price includes the step of identifying the customer, and wherein the price is established in part on the identity of the customer.

103. The method of claim 99 additionally comprising the step evaluating a credential presented by the customer before establishing the purchase price.

104. The method of claim 99 additionally comprising the step of evaluating a coupon presented by the customer before establishing the purchase price.

105. The method of claim 98 additionally comprising the step of retransmitting the encrypted digital good and a timestamp to the customer when the first and second checksums do not match.

106. The method of claim 98 additionally comprising the step of aborting the purchase.

107. The method of claim 106 wherein said step of aborting the purchase is performed when the first and second checksums do not match.

108. The method of claim 98 wherein the timestamp is generated so as to be fresh at the end of the transmission of the encrypted digital good.

109. The method of claim 98 additionally comprising the step of adding a unique serial number to the electronic payment order.

110. The method of claim 98 additionally comprising the step of transmitting the first cryptographic checksum to the customer.

111. The method of claim 98 additionally comprising the step of forwarding a message containing a decryption key to the customer.

112. The method of claim 98 wherein the digital good includes a digitized receipt for a nondigital good.

113. Apparatus for selling and delivering a digital good over a network, comprising:

means for receiving a purchase request for a digital good from a customer;

means, responsive to said means for receiving, for encrypting the digital good;

means for calculating a first cryptographic checksum for the encrypted good;

means for generating a timestamp;

means for transmitting the encrypted digital good and the timestamp to the customer;

said means for receiving receiving an electronic payment order from the customer containing information identifying the transaction, a second cryptographic checksum, and the timestamp;

means for comparing the first and second checksums;

means, responsive to said means for comparing, for adding an electronic signature of the merchant and a decryption key to the electronic payment order when the first and second checksums match;

said means for transmitting transmitting the merchant signed electronic payment order and key for review.

114. A method of reviewing the sale of a digital good over a network, comprising the steps of:

reviewing the information in an electronic payment order signed by a merchant and containing a decryption key;

sending a message to the merchant in response to the review;

debiting the customer's account when the review is positive;

crediting the merchant's account when the review is positive;

logging the transaction in response to the review; and saving a copy of the key.

115. The method of claim 114 wherein the electronic payment order includes a digital signature of the customer, and wherein said step of reviewing the information includes the step of verifying the customer's signature and the merchant's signature.

116. The method of claim 114 wherein said step of reviewing the information includes the step of verifying that the customer has the funds needed to make the purchase.

117. The method of claim 114 wherein said step of reviewing the information includes the step of verifying that the customer has the credit needed to make the purchase.

118. The method of claim 114 wherein said step of reviewing the information includes the step of verifying that the customer is authorized to make the purchase.

119. The method of claim 114 wherein said step of reviewing the information includes the step of reviewing a timestamp to determine if the transaction is stale.

120. The method of claim 114 wherein said step of reviewing the information includes the step of reviewing a serial number.

121. The method of claim 114 additionally comprising the step of a sending a message containing a decryption key.

122. The method of claim 114 wherein the digital good includes a digitized receipt for a nondigital good.

123. The method of claim 114 additionally comprising the step of providing an update of the status of the review.

124. The method of claim 114 additionally comprising the step of providing an update of the status of the customer's account.

125. The method of claim 114 additionally comprising the step of providing an update of the status of the merchant's account.

126. Apparatus for reviewing the sale of a digital good over a network, comprising:

means for receiving an electronic payment order signed by a merchant and containing a decryption key;

means for reviewing the information in the received electronic payment order and the merchant signature;

means for sending a message to the merchant in response to the review;

means for debiting the customer's account when the review is positive;

means for crediting the merchant's account when the review is positive;

means for logging the transaction in response to the review; and means for saving a copy of the key in response to the review.

127. A method of establishing a shared session key between a client and server over a computer network comprising the steps of:

(a) generating a one-time random symmetric key;

(b) generating a message consisting of the one-time random symmetric key, the identity of the server, the identity of the client, and a timestamp;

(c) encrypting the message with the public key of the server;

(d) adding the client's digital signature to the encrypted message;

(e) transmitting the signed encrypted message from the client to the server;

(f) receiving the message by the server;

(g) verifying the customer's signature;

(h) decrypting the message;

(i) constructing a return message consisting of a randomly generated symmetric session key and a Kerberos-style ticket containing the key;

(j) encrypting the return message using the one-time random symmetric key received from the client;

(k) transmitting the return message from the server to the client;

(l) receiving the return message by the client; and (m) decrypting the return message using the one-time random symmetric key to recover the Kerberos-style ticket and session key.

128. The method of claim 127 additionally comprising the step of encrypting the Kerberos-style ticket with a key known only to the server.

* * * * *